(12) United States Patent
Hurst et al.

(10) Patent No.: US 9,061,605 B2
(45) Date of Patent: Jun. 23, 2015

(54) RECLINER ASSEMBLY WALK-IN ACTUATOR

(75) Inventors: Nelson E. Hurst, Westland, MI (US); Peter Paul Zeimis, Shelby Township, MI (US); Jeffrey P. Carroll, West Bloomfield, MI (US)

(73) Assignee: Magna Seating Inc., Aurora, Ontario (CA)

( * ) Notice: Subject to any disclaimer, the term of this patent is extended or adjusted under 35 U.S.C. 154(b) by 346 days.

(21) Appl. No.: 13/508,737

(22) PCT Filed: Nov. 25, 2010

(86) PCT No.: PCT/CA2010/001895
§ 371 (c)(1),
(2), (4) Date: May 9, 2012

(87) PCT Pub. No.: WO2011/063528
PCT Pub. Date: Jun. 3, 2011

(65) Prior Publication Data
US 2012/0228913 A1    Sep. 13, 2012

Related U.S. Application Data

(60) Provisional application No. 61/264,683, filed on Nov. 26, 2009.

(51) Int. Cl.
*B60N 2/02* (2006.01)
*B60N 2/12* (2006.01)
*B60N 2/20* (2006.01)
*B60N 2/30* (2006.01)
*B60N 2/06* (2006.01)

(52) U.S. Cl.
CPC .. *B60N 2/12* (2013.01); *B60N 2/20* (2013.01); *B60N 2/3011* (2013.01); *B60N 2/06* (2013.01)

(58) Field of Classification Search
None
See application file for complete search history.

(56) References Cited

U.S. PATENT DOCUMENTS

| 5,788,330 | A  | * | 8/1998  | Ryan         | 297/378.12 |
| 6,139,104 | A  |   | 10/2000 | Brewer       |            |
| 6,152,533 | A  |   | 11/2000 | Smuk         |            |
| 6,336,679 | B1 |   | 1/2002  | Smuk         |            |
| 6,733,076 | B2 | * | 5/2004  | Grable et al.| 297/362    |

(Continued)

FOREIGN PATENT DOCUMENTS

| CA | 2452001       |   | 1/2003 |
| JP | 2008-74149 A  | * | 4/2008 |

(Continued)

*Primary Examiner* — David E Allred
(74) *Attorney, Agent, or Firm* — Miller Canfield

(57) ABSTRACT

A seat assembly includes a recliner operatively coupled between a seat back and a seat cushion. The recliner is operable between locked and unlocked conditions. Pivoting a recliner handle in a first direction actuates the recliner to the unlocked condition allowing pivotal movement of the seat back between a seating position and fold flat position. Pivoting a walk-in handle in a second direction actuates the recliner to the unlocked condition allowing pivotal movement of the seat back toward an inclined dump position. Pivoting the walk-in handle simultaneously pivots an EZ-entry link from a first position to an intermediate position. With the EZ-entry link in the intermediate position, the pivotal movement of the seat back toward the dump position urges the EZ-entry link from the intermediate position to a second position wherein the EZ-entry link blocks the seat back in the dump position.

8 Claims, 6 Drawing Sheets

(56) References Cited

U.S. PATENT DOCUMENTS

| | | | |
|---|---|---|---|
| 6,827,404 | B2 | 12/2004 | Blair et al. |
| 6,926,364 | B2 | 8/2005 | Cooley et al. |
| 7,021,716 | B2 | 4/2006 | Persad et al. |
| 7,503,099 | B2 | 3/2009 | Pejathaya |
| 8,038,217 | B2 * | 10/2011 | Yamagishi et al. ............ 297/341 |
| 8,205,944 | B2 * | 6/2012 | Watanabe .................... 297/341 |
| 8,449,034 | B2 * | 5/2013 | Tame et al. ............... 297/367 R |
| 2003/0080601 | A1 * | 5/2003 | Charras et al. ........... 297/378.12 |
| 2004/0056523 | A1 * | 3/2004 | Grable et al. ............ 297/378.12 |
| 2006/0119158 | A1 | 6/2006 | Haverkamp |
| 2009/0096270 | A1 | 4/2009 | Halbig et al. |
| 2009/0167068 | A1 * | 7/2009 | Yamagishi .................... 297/340 |
| 2010/0133886 | A1 * | 6/2010 | Gi et al. ....................... 297/341 |
| 2010/0283301 | A1 * | 11/2010 | Shanmugam et al. ..... 297/344.1 |
| 2012/0025581 | A1 * | 2/2012 | Watanabe ................ 297/354.12 |

FOREIGN PATENT DOCUMENTS

| | | | |
|---|---|---|---|
| KR | 20100062228 | * | 6/2010 |
| WO | WO 2008120415 A1 | * | 10/2008 |

* cited by examiner

RECLINER ASSEMBLY WALK-IN ACTUATOR

BACKGROUND OF THE INVENTION

1. Field of the Invention

The invention relates to a recliner assembly for a seat assembly of an automotive vehicle. More particularly, the invention relates to a recliner assembly for selectively pivoting a seat back of the seat assembly between a plurality of seating positions, a dump position and a fold-flat position and wherein pivoting the seat back to the dump position releases a seat track locking mechanism.

2. Description of Related Art

Automotive vehicles include seat assemblies for supporting occupants within the vehicle. A typical seat assembly includes a seat cushion and a seat back operatively coupled to the seat cushion by a recliner assembly allowing selective pivotal adjustment of the seat back relative to the seat cushion between a plurality of rearwardly reclined seating positions. The seat back is also often pivotally movable to a forwardly inclined dump position and a fold-flat position overlying the seat cushion. With the seat back in the dump position ingress and egress to a rear seat assembly or storage area located behind the seat assembly is improved. With the seat back in the fold-flat position a load floor is extended to increase the vehicle cargo capacity.

It is known in the automotive seating art to provide a seat track assembly that slidably interconnects the seat assembly to a floor of the vehicle. The seat track assembly provides forward and rearward movement of the seat assembly along the floor to allow an occupant to select a particular fore/aft seating position. The seat track assembly typically includes a lower or fixed track mounted to the floor of the vehicle and an upper or movable track slidably engaging the fixed track and mounted to a bottom surface of the seat cushion. A locking mechanism is operatively coupled between the fixed and movable tracks and selectively locks the movable track relative to the fixed track.

It is also known to operatively couple the seat back and the locking mechanism such that when the seat back is pivoted to the dump position, the seat track assembly is unlocked allowing the seat assembly to move forward to an easy-entry position. With the seat back in the dump position and the seat assembly in the easy-entry position, ingress and egress to the rear seat assembly or storage area is made even easier.

It is desirable to provide an improved recliner assembly having a recliner handle for selectively adjusting a seat back between a plurality of rearwardly reclined seating positions and a fold flat position overlying a seat cushion. It is also desirable that the recliner assembly include a walk-in handle for selectively actuating the seat back between one of the plurality of reclined seating positions and a forwardly inclined dump position. It is further desirable that actuating the recliner assembly to pivot the seat back from one of the plurality of reclined seating positions to the dump position releases a seat track locking mechanism allowing a seat assembly to move forwardly to an easy-entry position.

SUMMARY OF THE INVENTION

According to one aspect of the invention, a seat assembly includes a seat back coupled to a seat cushion for pivotal movement between a seating position, a forwardly inclined dump position and a fold-flat position overlying the seat cushion. A recliner is operatively coupled between the seat back and seat cushion. The recliner is operable between a locked condition securing the seat back relative to the seat cushion and an unlocked condition allowing pivotal movement of the seat back relative to the seat cushion. A recliner handle is pivotally coupled to the seat cushion and is operatively coupled to the recliner. Pivoting the recliner handle in a first direction actuates the recliner to the unlocked condition allowing pivotal movement of the seat back between the seating position and the fold-flat position. An EZ-entry link is pivotally coupled to the seat cushion. The EZ-entry link is pivotal between a first position and a second position. A walk-in handle is pivotally coupled to the seat cushion and is operatively coupled to the recliner. Pivoting the walk-in handle in a second direction actuates the recliner to the unlocked condition allowing pivotal movement of the seat back toward the dump position and simultaneously pivots the EZ-entry link to an intermediate position between the first and second positions. The pivotal movement of the seat back toward the dump position urges the EZ-entry link from the intermediate position to the second position at which the EZ-entry link blocks the seat back in the dump position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
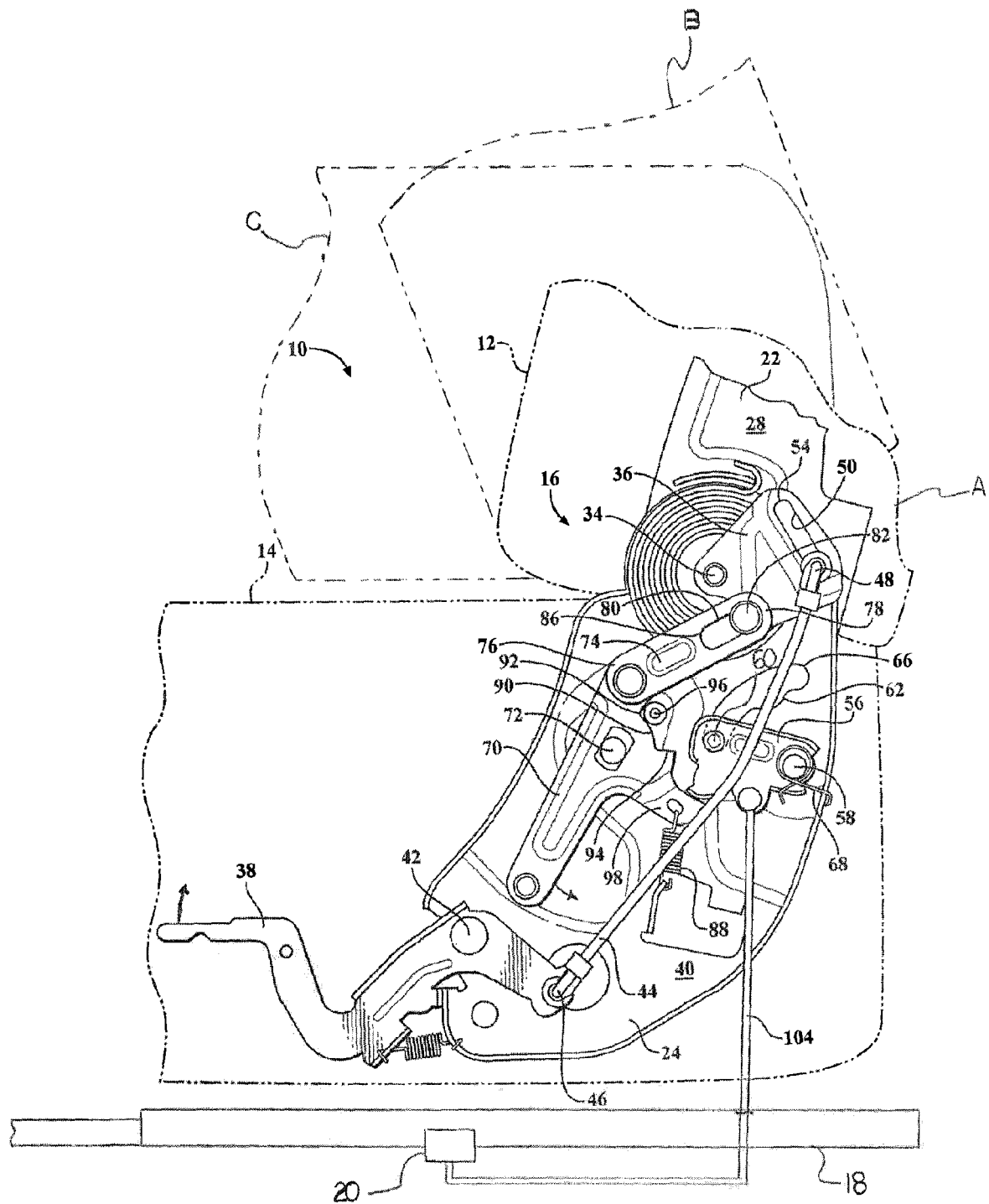
FIG. 1 is an outer side view of a recliner assembly according to one embodiment of the invention corresponding to a seat back in a rearwardly reclined seating position.

Referring to the Figures, a seat assembly for use in an automotive vehicle is generally shown at 10. The seat assembly 10 includes a seat back 12 operatively coupled to a seat cushion 14 by a recliner assembly, generally shown at 16. The recliner assembly 16 is operable for allowing selective pivotal movement of the seat back 12 relative to the seat cushion 14 between a plurality of rearwardly reclined seating positions A, a forwardly inclined dump position B, and a fold-flat position C overlying the seat cushion 14, as shown in FIG. 1. The seat back 12 is biased forwardly toward the dump position B and the fold-flat position C. As is well known in the vehicle seating art, a seat track assembly 18 is provided for slidably interconnecting the seat assembly 10 to a floor of the vehicle. The seat track assembly 18 allows selective fore and aft adjustment of the seat assembly 10 in a longitudinal direction along the vehicle floor. The seat track assembly 18 includes a latch mechanism 20 for securing the seat assembly 10 in any one of a plurality of fore/aft comfort positions. The seat track assembly 18 also allows the seat assembly 10 to move to a full-forward or easy-entry position that is disposed forward of the plurality of fore/aft comfort positions.

Referring to FIGS. 1 through 6, the construction of each of the seat back 12 and seat cushion 14 includes a rigid frame for supporting a contoured foam pad encased by a trim cover, as is well known to one skilled in the art. The frame of the seat back 12 includes an A-bracket 22 and the frame of the seat cushion 14 includes a B-bracket 24. In the embodiment shown, the A-bracket 22 is offset laterally inward relative to the B-bracket 24. A conventional disc recliner 26 is disposed between an outboard side 28 of the A-bracket 22 and an inboard side 30 of the B-bracket 24 operatively coupling the seat back 12 and the seat cushion 14. The side of the seat assembly 10 not shown in the Figures may include a simple pivot connection between the seat back 12 and the seat cushion 14 or a second disc recliner that is linked with the first disc recliner 26 for synchronized actuation thereof.

The disc recliner 26 is operable between a locked condition securing the position of the seat back 12 and an unlocked condition allowing pivotal movement of the seat back 12 about a laterally extending pivot axis. A shaft 34 for actuating the disc recliner 26 from the locked condition to the unlocked condition extends along and defines the pivot axis. Rotating the shaft 34 in a first direction (clockwise when viewed from FIGS. 1, 3 and 5) actuates the disc recliner 26 from the locked condition to the unlocked condition. A drive lever 36 is fixedly secured to the shaft 34 such that pivoting the drive lever 36 in the first direction causes the shaft 34 to rotate in the first direction, thereby actuating the disc recliner 26 from the locked condition to the unlocked condition.

A recliner handle 38 is pivotally coupled to an outboard side 40 of the B-bracket 24 at pivot 42 and is operatively coupled to the drive lever 36 for actuating the disc recliner 26 from the locked condition to the unlocked condition. More specifically, a connecting rod 44 operatively couples the recliner handle 38 and the drive lever 36. The connecting rod 44 extends between a first end 46 pivotally coupled to the recliner handle 38 and a second end 48 pivotally and slidably coupled to a slot 50 in the drive lever 36. The slot 50 extends between a first end 52 and a second end 54. With the recliner handle 38 in a rest position and the disc recliner 26 in the locked condition the drive lever 36 is oriented such that the second end 48 of the connecting rod 44 is at the first end 52 of the slot 50, as shown in FIG. 1. Pivoting the recliner handle 38 in the first direction, clockwise, about pivot 42 pulls the connecting rod 44 downwardly, which pivots the drive lever 36 in the first direction, thereby actuating the disc recliner 26 from the locked condition to the unlocked condition. The seat back 12 can now be adjusted between the plurality of rearwardly reclined seating positions and the fold-flat position.

An EZ-entry link 56 is provided to stop the seat back 12 in the dump position. The EZ-entry link 56 is pivotally coupled to the outboard side 40 of the B-bracket 24 at pivot 58. The EZ-entry link 56 includes a post 60 extending laterally inward through an arcuate slot 62 in the B-bracket 24. The arcuate slot 62 extends between a first end 64 and a second end 66. The EZ-entry link 56 is biased by a spring 68 or similar mechanism toward a first position wherein the post 60 is disposed at the first end 64 of the slot 62, best seen in FIGS. 1 and 2. The EZ-entry link 56 pivots between the first position and a second position, shown in FIG. 5, wherein the post 60 is disposed at the second end 66 of the slot 62.

A walk-in handle 70 is pivotally coupled to the outboard side 40 of the B-bracket 24 at pivot 72 and is operatively coupled to the drive lever 36 for actuating the disc recliner 26 from the locked condition to the unlocked condition. More specifically, a connecting link 74 operatively couples the walk-in handle 70 and the drive lever 36. The connecting link 74 extends between a first end 76 pivotally coupled to the walk-in handle 70 and a second end 78 having a slot 80. The drive lever 36 includes a pin 82 that is disposed in the slot 80 thereby pivotally and slidably coupling the connecting link 74 to the drive lever 36. The slot 80 extends between a first end 84 and a second end 86. An extension spring 88 is connected between the walk-in handle 70 and the B-bracket 24 and biases the walk-in handle 70 in the first direction to an initial position, shown in FIG. 1. The walk-in handle 70 includes a recess 90 extending between a first end 92 and a second end 94. In the initial position the first end 92 of the recess 90 abuts a stop post 96 protruding from the outboard side 40 of the B-bracket 24. With the walk-in handle 70 in the initial position and the disc recliner 26 in the locked condition the drive lever 36 is oriented such that the pin 82 is at the first end 84 of the slot 80, as shown in FIG. 1. Pivoting the walk-in handle 70 in a second direction (counterclockwise when viewed from FIGS. 1, 3 and 5) pulls the connecting link 74 forwardly, which pivots the drive lever 36 in the first direction, thereby actuating the disc recliner 26 from the locked condition to the unlocked condition. The seat back 12 can now be pivoted forwardly from one of the plurality of rearwardly reclined seating positions A toward the dump position B.

Figure 3:
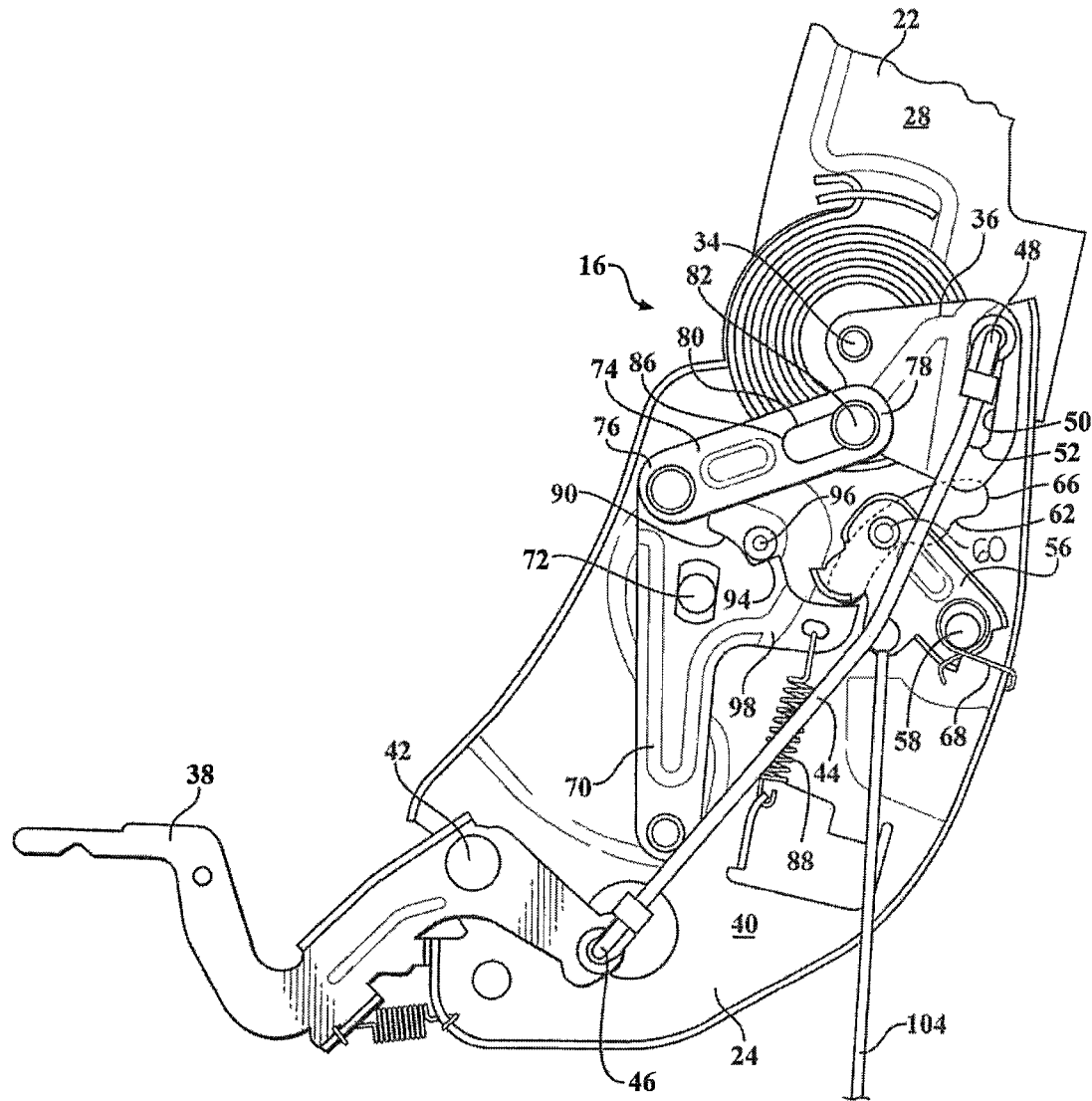
FIG. 3 is an outer side view of the recliner assembly with a disc recliner in an unlocked condition and corresponding to the seat back between the rearwardly reclined seating position and a forwardly inclined dump position.
Figure 4:
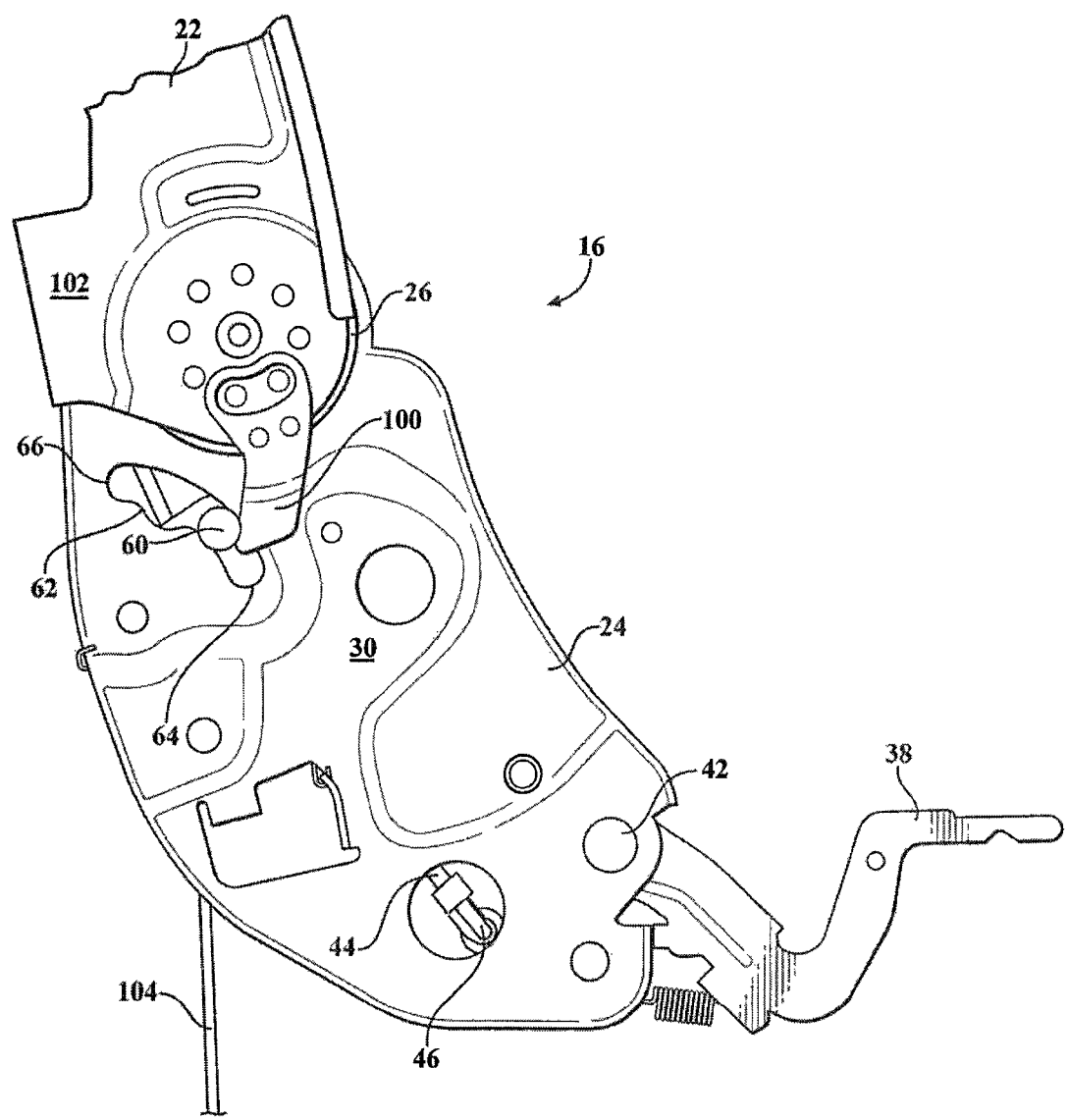
FIG. 4 is an inner side view of the recliner assembly with the disc recliner in the unlocked condition and corresponding to the seat back between the rearwardly reclined seating position and the forwardly inclined dump position.
Figure 5:
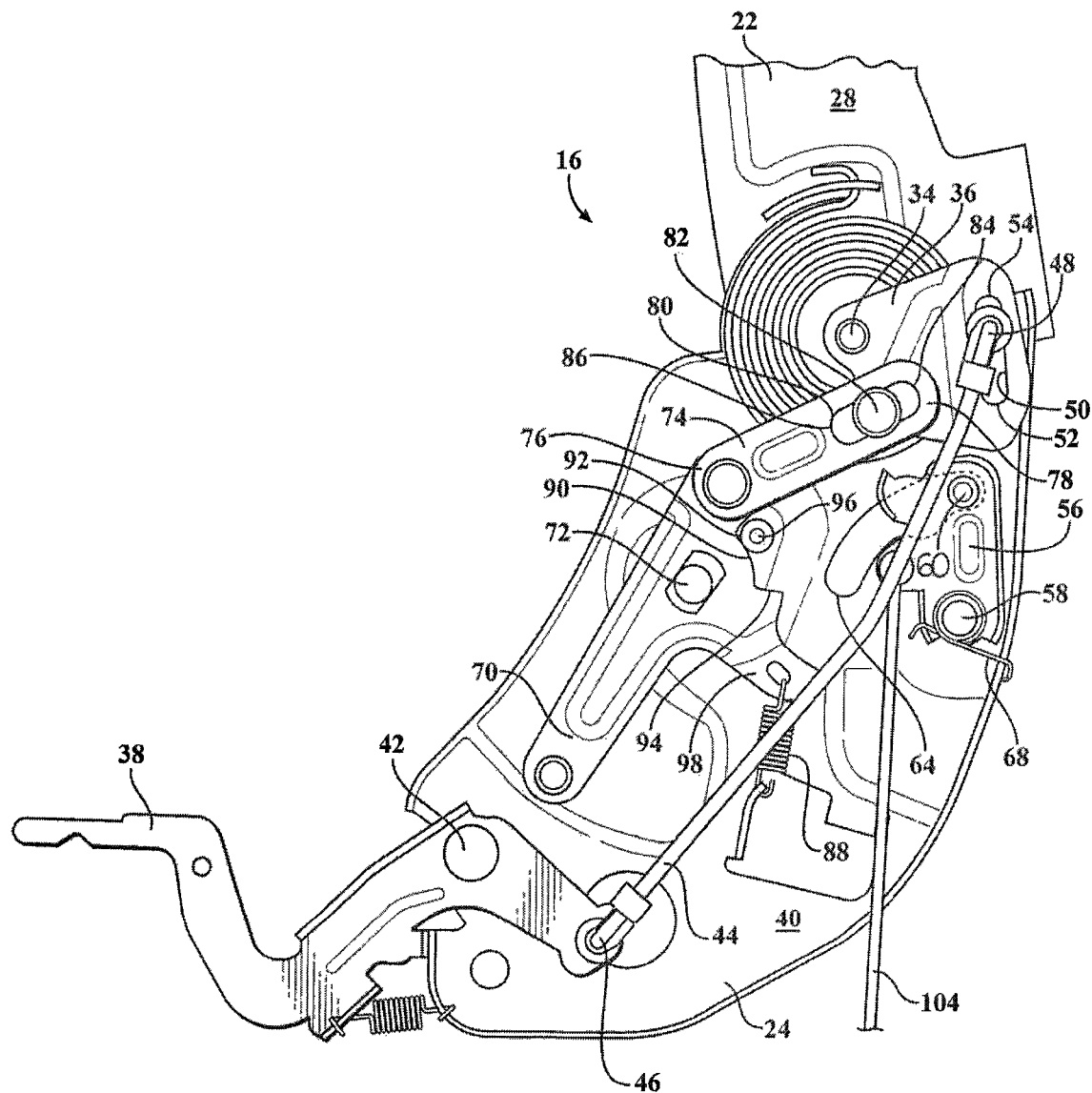
FIG. 5 is an outer side view of the recliner assembly corresponding to the seat back in the forwardly inclined dump position.

The walk-in handle 70 includes an extension 98 engageable with the EZ-entry link 56. As the walk-in handle 70 pivots in the second direction to actuate the disc recliner 26 from the locked condition to the unlocked condition the extension 98 engages the EZ-entry link 56 and pivots the EZ-entry link 56 in the first direction from the first position to an intermediate position between the first and second positions, as shown in FIGS. 3 and 4. In the intermediate position the post 60 is generally midway between the first and second ends 64, 66 of the arcuate slot 62. The intermediate position of the EZ-entry link 56 is determined by the pivotal movement of the walk-in handle 70. More specifically, the walk-in handle 70 pivots in the second direction from the initial position to an actuated position defined by the second end 94 of the recess 90 abutting the stop post 96 protruding from the outboard side 40 of the B-bracket 24. Thus, the stop post 96 limits the pivotal movement of the walk-in handle 70 to position the EZ-entry link 56 in the intermediate position.

Figure 2:
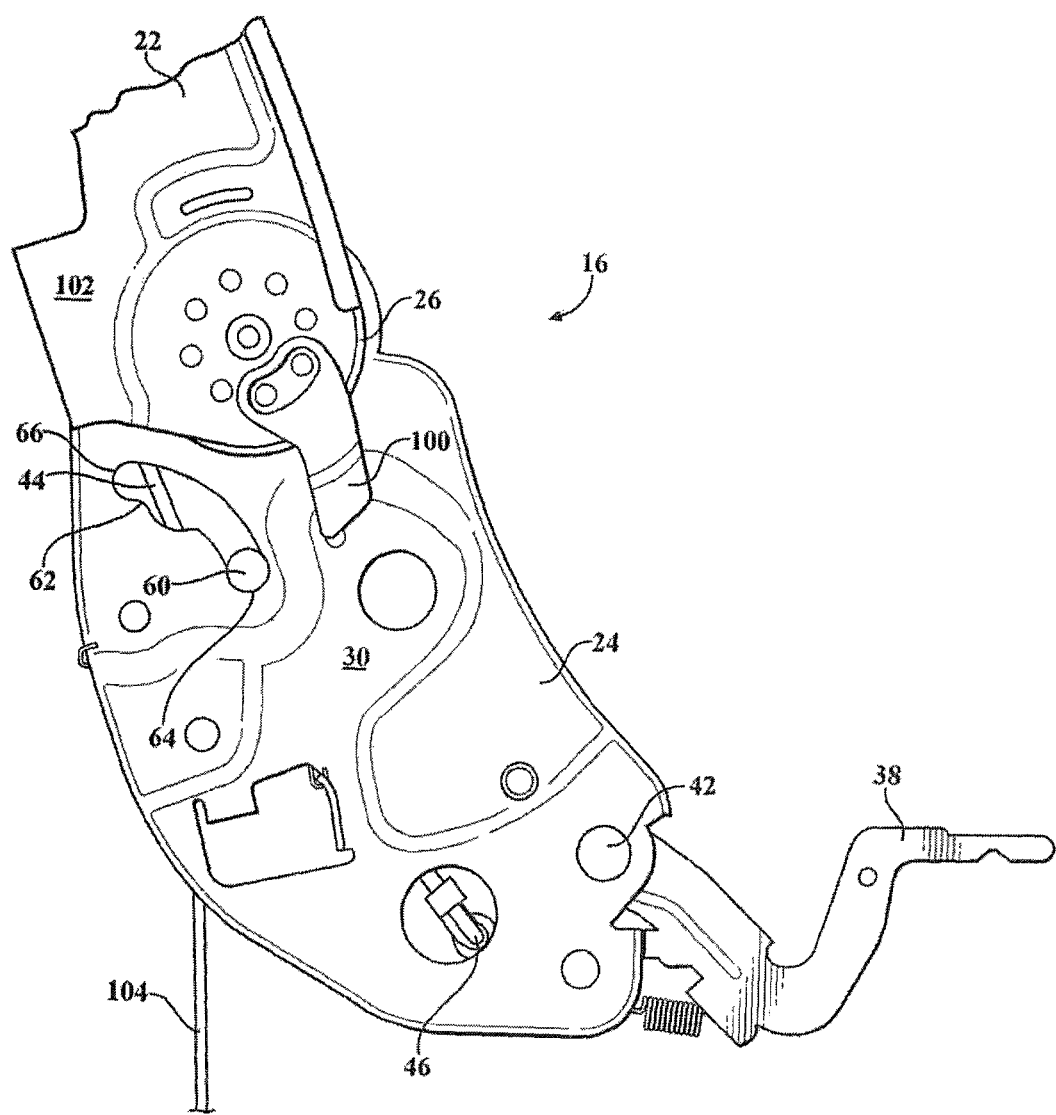
FIG. 2 is an inner side view of the recliner assembly corresponding to the seat back in the rearwardly reclined seating position.
Figure 6:
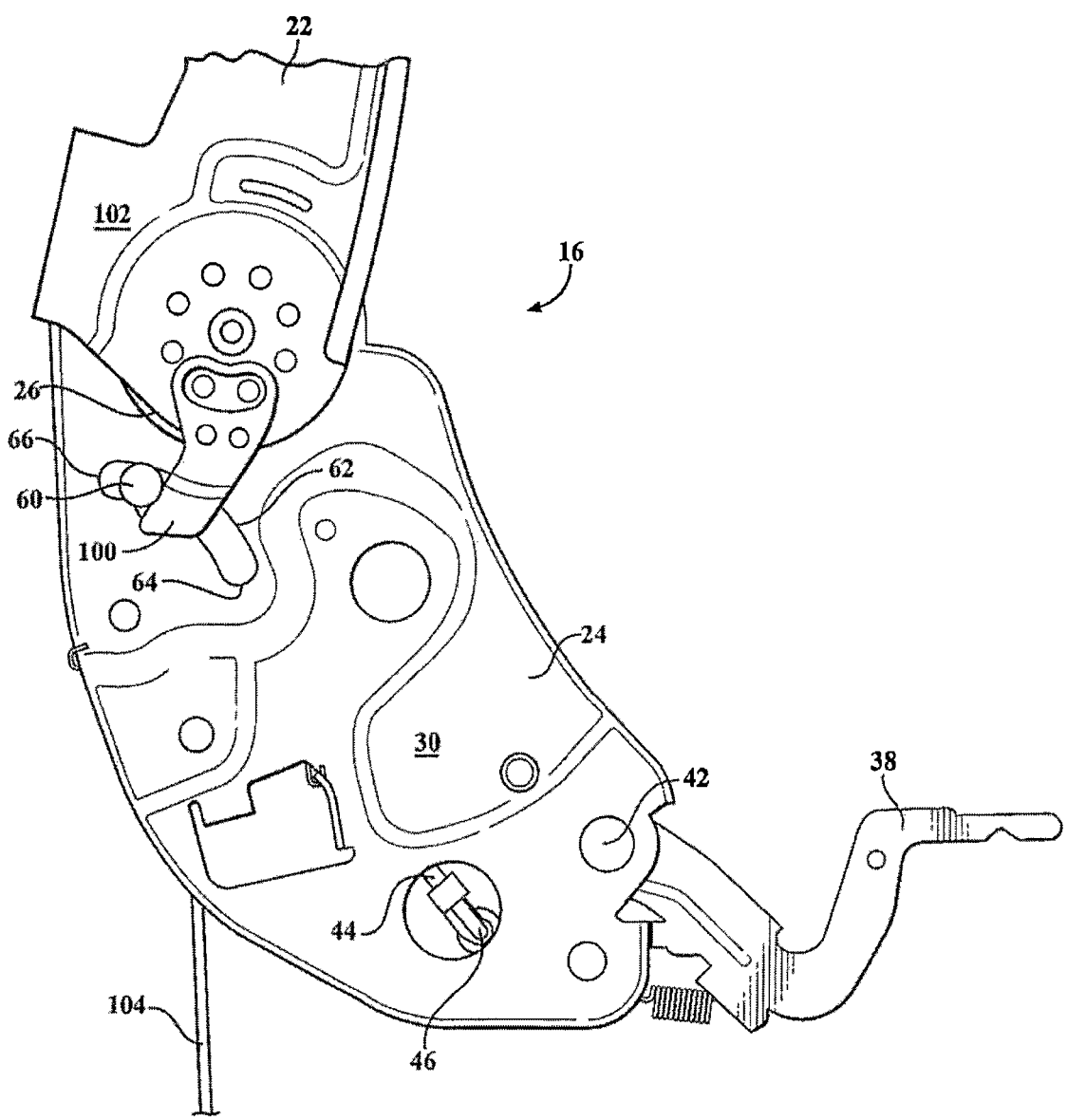
FIG. 6 is an inner side view of the recliner assembly corresponding to the seat back in the forwardly inclined dump position.

A drive finger 100 is fixedly secured to an inboard side 102 of the A-bracket 22 at a lower end thereof, as shown in FIGS. 2, 4 and 6. The drive finger 100 extends downwardly from the A-bracket 22 and is adapted for engaging the post 60 extending from the EZ-entry link 56. More specifically, when the EZ-entry link 56 is in the intermediate position such that the post 60 is generally midway between the first and second ends 64, 66 of the arcuate slot 62 the post 60 is positioned to interfere with the drive finger 100. As the seat back 12 pivots forwardly from one of the rearwardly reclined seating positions A toward the dump position B, the drive finger 100 engages the post 60 and urges the post 60 toward the second end 66 of the arcuate slot 62 thereby pivoting the EZ-entry link 56 in the first direction from the intermediate position to the second position. When the post 60 reaches the second end 66 of the arcuate slot 62 further pivoting of the EZ-entry link 56 is prevented, which in turn blocks the seat back 12 from further pivoting. The seat back 12 is now in the dump position B.

A Bowden-type cable 104 is operatively coupled between the EZ-entry link 56 and the latch mechanism of the seat track assembly. Pulling the cable 104 actuates the latch mechanism from a latched position to an unlatched position. In the latched position the seat assembly 10 is secured in one of the plurality of fore/aft comfort positions. In the unlatched position the seat assembly 10 is free to move to the easy-entry position that is forward of the plurality of fore/aft comfort positions. Pivoting the EZ-entry link 56 in the first direction from the intermediate position to the second position pulls the cable 104 to actuate the latch mechanism from the latched position to the unlatched position.

In operation, beginning with the seat back 12 in one of the plurality of rearwardly reclined seating positions the recliner handle 38 may be pivoted in the first direction to actuate the disc recliner 26 from the locked condition to the unlocked condition to allow adjustment of the seat back 12 between the plurality of rearwardly reclined seating positions A and the fold-flat position C. Pivoting the recliner handle 38 in the first direction pulls the connecting rod 44 downwardly, which pivots the drive lever 36 in the first direction, thereby actuating the disc recliner 26 from the locked condition to the unlocked condition. As the drive lever 36 pivots in the first direction the pin 82 travels from the first end 84 toward the second end 86 of the slot 80 in the connecting link 74. Thus, as the drive lever 36 pivots in the first direction in response to pivoting the recliner handle 38, the connecting link 74 and therefore the walk-in handle 70 remain stationary. Because the walk-in handle 70 remains stationary, the EZ-entry link 56 remains in the first position with the post 60 at the first end 64 of the arcuate slot 62. Therefore, the post 60 is out of the path of travel of the drive finger 100 as the seat back 12 pivots between the plurality of rearwardly reclined seating positions A and the fold-flat position C.

Alternatively, beginning with the seat back 12 in one of the plurality of rearwardly reclined seating positions A, the walk-in handle 70 may be pivoted in the second direction to actuate the disc recliner 26 from the locked condition to the unlocked condition to allow adjustment of the seat back 12 between one of the plurality of rearwardly reclined seating positions A and the dump position B. Pivoting the walk-in handle 70 in the second direction pulls the connecting link 74 forwardly, which pivots the drive lever 36 in the first direction, thereby actuating the disc recliner 26 from the locked condition to the unlocked condition. As the walk-in handle 70 pivots in the second direction the extension 98 engages the EZ-entry link 56 and pivots the EZ-entry link 56 in the first direction from the first position to the intermediate position. As the seat back 12 pivots from one of the plurality of rearwardly reclined seating positions A toward the dump position B, the drive finger 100 engages the post 60 and pivots the EZ-entry link 56 in the first direction from the intermediate position to the second position to release the latch mechanism 20 and allow sliding fore/aft movement of the seat track assembly 18. With the EZ-entry link 56 in the second position, the seat back 12 is also prevented from further pivoting and is supported in the dump position B. In addition, as the drive lever 36 pivots in the first direction the second end 48 of the connecting rod 44 travels from the first end 52 toward the second end 54 of the slot 50 in the drive lever 36. Thus, as the drive lever 36 pivots in the first direction in response to pivoting the walk-in handle 70, the connecting rod 44 and therefore the recliner handle 38 remain stationary.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A seat assembly comprising:
a seat cushion;
a seat back pivotally coupled to said seat cushion, said seat back pivotal between a seating position and a fold-flat position overlying said seat cushion;
a recliner operatively coupled between said seat back and said seat cushion, said recliner operable between a locked condition securing said seat back relative to said seat cushion and an unlocked condition allowing pivotal movement of said seat back relative to said seat cushion;
a recliner handle pivotally coupled to said seat cushion and operatively coupled to said recliner, wherein pivoting said recliner handle in a first direction actuates said recliner to said unlocked condition allowing pivotal movement of said seat back between said seating position and said fold-flat position;
an EZ-entry link pivotally coupled to said seat cushion, said EZ-entry link pivotal between a first position and a second position;
a walk-in handle pivotally coupled to said seat cushion and operatively coupled to said recliner, wherein pivoting said walk-in handle in a second direction actuates said recliner to said unlocked condition allowing pivotal movement of said seat back toward a forwardly inclined dump position between said seating and fold-flat positions, and wherein pivoting said walk-in handle in said second direction simultaneously pivots said EZ-entry link to an intermediate position between said first and second positions; wherein said pivotal movement of said seat back toward said dump position urges said EZ-entry link from said intermediate position to said second position, said second position of said EZ-entry link blocking said pivotal movement of said seat back in said dump position;
a drive lever operatively coupled between said recliner and each of said recliner handle and said walk-in handle for actuating said recliner between said locked and unlocked conditions in response to pivotal movement of each of said recliner handle and said walk-in handle; and
a connecting rod having a first end connected to said recliner handle and an opposite second end slidably connected to said drive lever wherein said drive lever includes an elongated slot formed therein for receiving said second end of said connecting rod for pivoting said drive lever and actuating said recliner between said locked and unlocked conditions in response to pivotal movement of said recliner handle while preventing pivotal movement of said recliner handle in response to pivotal movement of said walk-in handle.

2. A seat assembly as set forth in claim 1 further including a connecting link having a first end connected to said walk-in handle and an opposite second end slidably connected to said drive lever wherein said drive lever includes a pin and said connecting link includes an elongated slot for receiving said pin therein for pivoting said drive lever and actuating said recliner between said locked and unlocked conditions in response to pivotal movement of said walk-in handle while preventing pivotal movement of said walk-in handle in response to pivotal movement of said recliner handle.

3. A seat assembly as set forth in claim 2 wherein said walk-in handle includes a extension for engaging and pivoting said EZ-entry link between said first position and said intermediate position in response to pivotal movement of said walk-in handle.

4. A seat assembly as set forth in claim 3 wherein said EZ-entry link includes a spring coupled between said seat cushion and said EZ-entry link for biasing said EZ-entry link toward said first position.

5. A seat assembly as set forth in claim 4 wherein said EZ-entry link includes a post projecting therefrom and said seat back includes a drive finger extending therefrom for engaging said post when said EZ-entry link is in said intermediate position to pivot said EZ-entry link from said intermediate position to said second position in response to pivotal movement of said seat back from said seating position to said dump position.

6. A seat assembly as set forth in claim 5 wherein said seat cushion includes a seat cushion bracket for pivotally supporting said EZ-entry link, said seat cushion having an arcuate slot formed therein for receiving said post and guiding said EZ-entry link between said first and second positions.

7. A seat assembly as set forth in claim 6 further including a seat track assembly coupled to said seat cushion for providing fore and aft sliding movement of said seat assembly and said seat track assembly including a latch mechanism for selectively allowing said fore and aft sliding movement.

8. A seat assembly as set forth in claim 7 further including a cable extending between said EZ-entry link and said latch mechanism for actuating said latch mechanism in response to pivotal movement of said EZ-entry link between said intermediate position and said second position.

* * * * *